Nov. 30, 1948.    R. R. DUPLER    2,455,240
FEED VALVE

Filed Feb. 25, 1946    2 Sheets-Sheet 1

INVENTOR
Raymond R. Dupler
BY
Dresser and Harding
ATTORNEYS.

WITNESS:
Robt P. Kitchel

Patented Nov. 30, 1948

2,455,240

UNITED STATES PATENT OFFICE 2,455,240

FEED VALVE

Raymond R. Dupler, Toledo, Ohio, assignor to Sun Oil Company, Philadelphia, Pa., a corporation of New Jersey Application February 25, 1946, Serial No. 650,097

3 Claims. (Cl. 210—36)

This invention relates to an improved feed valve for introducing and dissolving solid materials into a liquid which may be contained in a vessel or be under pressure in a pipe line.

It is the principal object of this invention to provide a valve structure for holding dissolvable material and which is adapted to be secured to a pipe line or other vessel containing a liquid and having positively controlled and adjustable means for introducing and dissolving solid material contained within the valve body into the liquid. Additional means are provided for sampling the liquid to determine the amount of dissolved solids therein and hence the rate of solution in order that the positively controlled valve means may be adjusted to obtain the desired results.

It is also an important object of this invention to provide a feed valve structure comprising a liquid tight body having an end portion for receiving solid dissolvable material and which may be readily joined to a pipe line containing a liquid in which solids are to be dissolved and means within the body to regulate the area of contact between the solid material contained in the end portion of the valve and the liquid in the pipe.

It is a further object of this invention to provide the solid or crystalline material holding portion of the valve in such a manner as to prevent or reduce the passage of the solids into the liquid.

As stated the invention relates to a controllable feed valve means for introducing a solid to be dissolved in a liquid, which finds particular utility in the field of dissolving chemicals such as copper sulphate into a stream of water. It has been the practice particularly around petroleum refineries to dissolve copper sulphate in the water by broadcasting crystals of this material over the top of a cooling tower. Obviously, with such a procedure, there is no positive control over the contact between the crystals and the water and therefore many things may interfere with the dissolution of the crystals to give an uneven rate of solution and prevent the obtaining of a high concentration of dissolved solids as soon as possible. With the feed valve of this invention the copper sulphate may be placed into contact with the water under pressure in the return pipe line to the cooling tower and the degree of contact may be positively controlled to fix the rate of solution and obtain the desired concentration of dissolved solids as soon as possible. It is a further advantage of this invention that upon opening the feed valve into a pipe line containing a liquid under any reasonable amount of pressure, a pressure differential is immediately created which aids in the dissolution by forcing the chemicals into the liquid without the assistance of any remotely controlled repressuring means.

Further objects and advantages will be apparent by reference to the following specification and drawings, in which.

Figure 1:
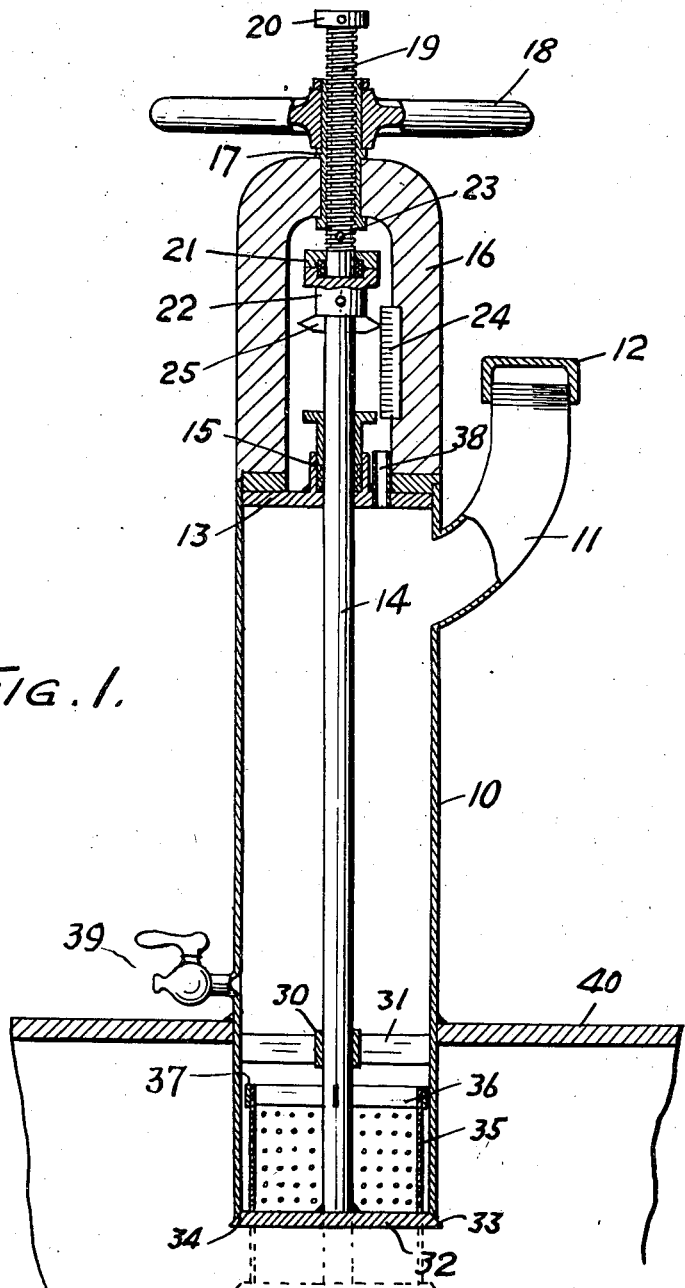
Figure 1 is a longitudinal section of the feed valve installed for operation in a fluid line.

Referring to Figure 1 of the drawings: the feed valve structure is provided with the tubular body member 10 which may be adapted to contain a quantity of solid material to be dissolved. The solid material may be placed within the body 10 through the pipe elbow 11 having a screw threaded filler cap 12 in order that the chamber within the body 10 may be kept liquid tight. The upper end of the tubular body 10 is closed by the end plate 13 through which passes the valve rod 14. The rod 14 is rotatably and slidably journaled in the liquid-tight stuffing box 15 which is welded to the end plate 13 to thus provide a seal. A cast metal yoke member 16 is secured to the plate 13 and the hub of the yoke member 16 is provided with a threaded bushing 17 which extends above the yoke member to receive a hand wheel 18. The threaded shaft 19 is received in and cooperates with the bushing 17, for actuating shaft 14 and a pin 23 extends transversely through the shaft 19 to engage a leg of the yoke member 16 to prevent rotation of the shaft 19 in such manner that when the hand wheel 18 and bushing 17 are rotated therewith, the shaft 19 is caused to be axially moved in or out of the bushing 17 in accordance with the direction of rotation of the hand wheel. A nut 20 at the upper end of the shaft 19 limits the maximum inward movement of the shaft 19 and hence controls the maximum opening of the valve and area of contact between the solid and liquid, as will be later described.

The valve operating rod 14 is secured to the lower end of the threaded shaft 19 by a coupling 21 in the form of a friction clutch and an integral nut 22 which permits the shaft 14 to be rotated by applying a wrench to the nut 22 without causing rotation of the threaded shaft 19 which as before pointed out is prevented from rotating by the pin 23. Thus the valve operating rod 14 is reciprocated within the body 10 when the hand wheel 18 is rotated. An indicator 25 is attached to the rod 14 and cooperates with a scale 24 on one of the legs of the yoke member to show the axial position of the valve rod 14 and hence the degree of opening of the valve to be later described.

Figure 3:
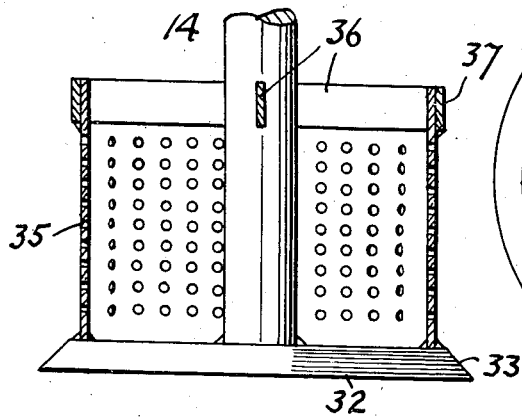
Figure 3 is an enlarged fragmentary section of a portion of the valve member shown in Figure 1.
Figure 4:
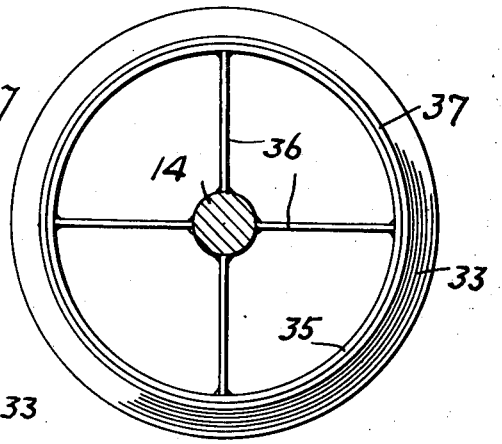
Figure 4 is a top elevation showing details of Figure 3.

The rod 14, near its lower end, is rotatably and slidably journaled in a bushing 30 having arms 31 radiating therefrom which are fixed to the inner wall of member 10 and secured to the end of the rod 14 at its lower end is a plate 32 shown in detail in Figs. 3 and 4. The plate 32 is disk shaped and is provided with a beveled edge 33 to cooperate with a similar beveled edge 34 formed at the lower end of the tubular member 10. A cylindrical screen 35 of slightly less diameter than the inside diameter of the tubular member 10 is secured to the plate 32 providing with the plate a receptacle for receiving solid crystalline material. The upper edges of the screen 35 are fixed to the rod 14 by braces 36 and a strengthening ring 37 surrounds the upper edge of the screen and additionally provides a sliding and sealing contact with the interior walls of the tubular member 10. The details of the apparatus just described in effect provide a dispensing valve for the material within the screen member 35 and when the valve is fully open it will assume the position shown by the dotted lines of Figure 1 and thus it will be seen that the cylindrical screen 35 and the sealing ring 37 cooperate with the lower portion of the tubular member 10 to prevent the passage of any solid particles out of the screen which are larger than predetermined size governed by the area of the screen openings. The tubular member 10 is provided with an air vent 38 at its upper end and a drain valve 39 at its lower end.

Figure 2:
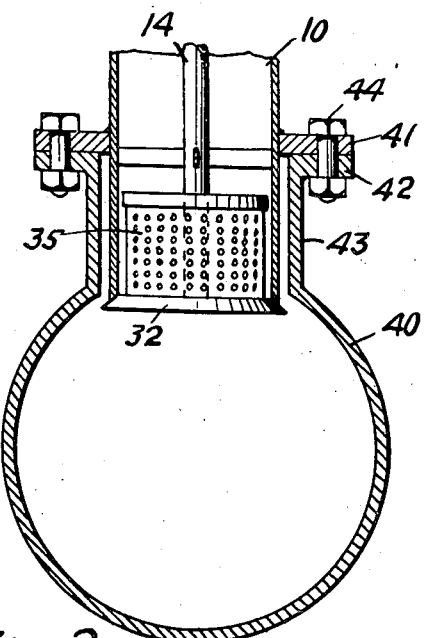
Figure 2 is a fragmentary elevation showing the manner of securing the valve to a pipe line, which is shown in transverse section.

Referring to Fig. 2 wherein the feed valve is shown installed on a fluid conduit 40: In order to effect the installation the tubular member 10 is provided with a laterally extending flange 41 which cooperates with a receiving flange 42 fixed to the conduit 40, for example by an upstanding cylindrical flange 43. The flanges 41 and 42 may be secured in fixed position by means of bolts 44. With the present device it will be appreciated that the screen 35 containing the crystalline material may be inserted into the conduit 40 to any desired depth and thus a predetermined amount of the crystals may be placed in solution depending on the operating conditions to which the device is subjected.

One mode of operating the mixing valve of this invention is as follows: The hand wheel 18 is first turned in a direction to raise the valve rod 14 and bring the beveled edge 33 of the plate 32 into sealing contact with the beveled edge 34 of the tubular member 10 to thus close the valve. The drain valve 39 and vent valve 38 are then opened to drain the fluid contents of the member 10. Thereafter, the drain valve 39 is closed and the filling cap 12 is removed to permit the granulated solids to be poured into the body 10. The vent 38 is then closed with a plug or other mechanical means not shown and the filling cap 12 replaced after which the hand wheel 18 may be turned in a direction to lower the valve rod and move the screen member 35 towards the dotted line open position of Figure 1. The granulated solids in the body 10 will be confined by the basket-like screen 35 which upon entering the stream of liquid under pressure in the pipe line 40 produces a differential pressure. This differential pressure aids in dissolving the solids in the liquid passing through the openings in the screen 35 regardless of what the pressure of the liquid may be. The amount of opening for the valve member 32 is indicated by the pointer 25 and scale 24. By drawing off liquid through the drain valve 39 a sampling of the solution in the dispensing chamber may be made at any time to determine the amount of dissolved solids in the liquid and the advisability of increasing or decreasing the rate of solution by suitably adjusting the position of the screen member 35. Difficulty is sometimes encountered when attempting to close the valve due to the accumulation of foreign matter on the beveled surfaces 33 and 34. In order to insure that the valve will be properly closed and sealed it is sometimes advisable to rotate the rod 14 and screen member 30 by applying a wrench to the surface of the nut 22.

Figure 5:
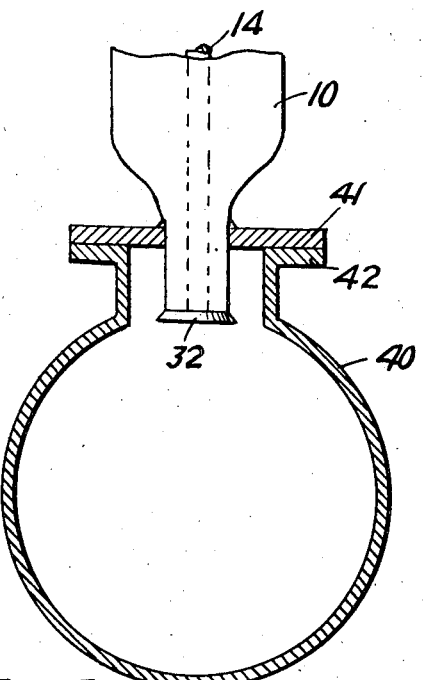
Figure 5 is a fragmentary elevation similar to Figure 2 but showing a modified form of the invention.

The modified form of the invention shown in Fig. 5 of the drawings may be used when the desired solution rate is to be less than that obtained with the valve just described. Since the parts are similar to that previously described like reference numerals have been used and it will be seen that the lower end of the valve body 10 is constructed to form a valve opening of less diameter than the diameter of the body. Thus a smaller area of contact between the liquid in the conduit 40 and the solids in the body 10 is obtained which reduces the maximum rate of solution from that in the previously described structure.

What I claim and desire to protect by Letters Patent is:

1. A dispensing device for supplying solid material to a body of liquid in a vessel comprising a housing having an open end in communication with said vessel and permitting access to the body of liquid therein, a shaft within said housing, means to move the shaft axially of the housing and a container for material to be discharged affixed to said shaft so as to contact the liquid body on the axial movement thereof, said container comprising a perforated side wall and a solid plate forming the bottom in support of said wall, said plate providing a valve member for closing said housing on removal of the container from contact with said liquid.

2. A dispensing device for supplying granular material to a body of liquid in a conduit comprising a housing having an open end in communication with said conduit and permitting access to the body of liquid therein, a shaft within said housing adapted for reciprocation longitudinally of said housing, a container for material to be dispensed affixed to said shaft so as to be moved through the open end of said housing, said container comprising a reticulated side wall and a solid plate forming the bottom in support of said wall, said plate providing a valve member for closing and sealing said housing on removal of the container from contact with said liquid, and means on said shaft to indicate visually the receptacle side wall depth which is in contact with the liquid.

3. A dispensing device for admixing crystalline material with a body of liquid in a conduit comprising an elongate tubular housing having an open end in communication with said conduit and permitting access to the body of liquid therein, a shaft within said housing, means at the upper end of said shaft to effect reciprocation of the shaft, a plate at the lower end of said shaft providing a valve member for the open end of said housing, a cylindrical screen secured to said plate and forming therewith a container, said plate being maintained normally in closed position with respect to the open end of said tubular housing and adapted through the reciprocable shaft to be lowered into the flowing body of liquid to dispense the crystalline material therein, an inlet for supplying crystalline material to the tubular housing for transmission to said container, and means on said shaft to indicate visually the depth of the container side wall in the body of liquid.

RAYMOND R. DUPLER.

REFERENCES CITED

The following references are of record in the file of this patent:

UNITED STATES PATENTS

| Number | Name | Date |
|---|---|---|
| 307,220 | Peters | Oct. 28, 1884 |
| 857,564 | Leopold et al. | June 18, 1907 |
| 888,469 | Case et al. | May 26, 1908 |
| 961,789 | Mussey | June 21, 1910 |
| 1,216,051 | Bayley | Feb. 13, 1917 |
| 1,476,090 | Lipsner et al. | Dec. 4, 1923 |
| 1,759,141 | Strain | May 20, 1930 |
| 1,855,990 | Saks | Apr. 26, 1932 |
| 2,363,622 | Rice | Nov. 28, 1944 |